United States Patent [19]
Janson, Jr.

[11] Patent Number: 5,493,358
[45] Date of Patent: Feb. 20, 1996

[54] DEPLOYABLE SUPPORT FOR FILM THREADING IN CAMERA

[75] Inventor: Wilbert F. Janson, Jr., Shortsville, N.Y.

[73] Assignee: Eastman Kodak Company, Rochester, N.Y.

[21] Appl. No.: 388,784

[22] Filed: Feb. 15, 1995

[51] Int. Cl.⁶ .............................. G03B 17/02; G03B 1/20
[52] U.S. Cl. ............................................. 354/203; 354/212
[58] Field of Search ................. 354/173.1, 202, 354/203, 212, 213, 214, 215, 216, 217, 218, 288

[56] References Cited

U.S. PATENT DOCUMENTS

| | | | |
|---|---|---|---|
| 2,858,752 | 11/1958 | Winkler et al. | 95/31 |
| 3,481,260 | 12/1969 | Ettischer | 354/212 |
| 4,397,535 | 8/1983 | Harvey | 354/212 |
| 4,839,678 | 6/1989 | Zawodny et al. | 354/217 |
| 5,075,708 | 12/1991 | Okumura et al. | 354/173.1 |
| 5,298,930 | 3/1994 | Asakura et al. | 354/173.1 |

FOREIGN PATENT DOCUMENTS 3-175434  7/1991  Japan.

*Primary Examiner*—A. A. Mathews
*Attorney, Agent, or Firm*—Roger A. Fields

[57] ABSTRACT

A camera comprises a film cartridge receiving chamber for receiving a film cartridge with a filmstrip having a film leader, a film passageway for the filmstrip, and a sprocket movable from outside to inside the film passageway to engage the filmstrip. A film slit is formed between the cartridge receiving chamber and the film passageway to permit the film leader to be longitudinally inserted through the film slit into the film passageway when the sprocket is outside the film passageway. A rear cover is located over the film passageway. A rear door independent of the rear cover is supported for closing to cover the cartridge receiving chamber and to move the sprocket from outside to inside the film passageway to engage the filmstrip, after the film leader is longitudinally inserted through the film slit into the film passageway.

4 Claims, 5 Drawing Sheets

DEPLOYABLE SUPPORT FOR FILM THREADING IN CAMERA

CROSS-REFERENCE TO RELATED APPLICATION

Reference is made to commonly assigned copending application Ser. No. 08/388,763, entitled DEPLOYABLE SUPPORT FOR FILM THREADING IN CAMERA and filed Feb. 15, 1995 in the name of Wilbert F. Janson.

FIELD OF THE INVENTION

The invention relates generally to the field of photography, and in particular to film threading in a camera.

BACKGROUND OF THE INVENTION

A conventional 35 mm film cartridge, such as manufactured by Eastman Kodak Company comprises a light-tight housing and an unexposed filmstrip. The filmstrip is supported in a roll on a rotatable spool inside the light-tight housing and has a film leader that protrudes outwardly through a light-trapping slit in the housing. A forward-most portion of the film leader has a reduced width as compared to the remainder of the filmstrip.

A typical camera intended to be used with the conventional film cartridge comprises a cartridge receiving chamber, a film take-up chamber, and a backframe opening between the cartridge receiving chamber and the film take-up chamber at which successive sections of the filmstrip (except for the protruding film leader) are to be exposed. To load the film cartridge into the camera, a rear door of the camera is opened to uncover the film take-up chamber, the backframe opening, and the film take-up chamber. Then the film cartridge is placed in the cartridge-receiving chamber and the protruding film leader is positioned over the backframe opening. The forward-most reduced width portion of the film leader rests on a film rail alongside the backframe opening to be engaged by a sprocket that protrudes out of an opening in the film rail. When the rear door is closed, the sprocket is rotated in engagement with the forward-most reduced width portion of the film leader to thread or advance the forward-most reduced width portion of the film leader into the film take-up chamber. See prior art U.S. Pat. No. 4,397,535, issued Aug. 9, 1983.

SUMMARY OF THE INVENTION

A camera comprising a cartridge receiving chamber for receiving a film cartridge with a filmstrip having a film leader, a film passageway for the filmstrip, and a sprocket movable from outside to inside the film passageway to engage the filmstrip, is characterized in that:

a film slit is formed between the cartridge receiving chamber and the film passageway to permit the film leader to be longitudinally inserted through the film slit into the film passageway when the sprocket is outside the film passageway;

a rear cover is located over the film passageway;

a rear door independent of the rear cover is supported for closing to cover the cartridge receiving chamber and to move the sprocket from outside to inside the film passageway to engage the filmstrip, after the film leader is longitudinally inserted through the film slit into the film passageway.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
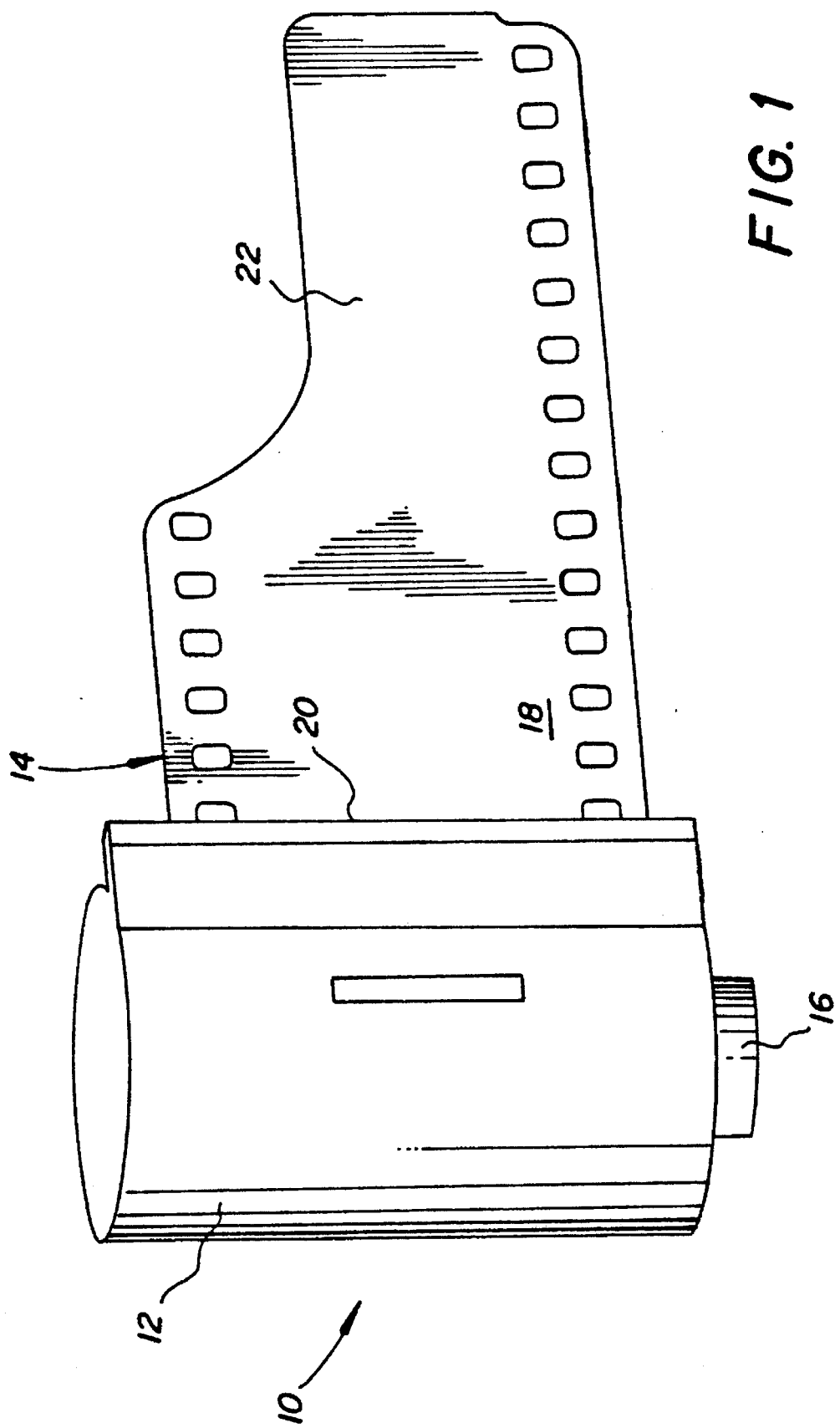
FIG. 1 is an elevation view of a conventional 35 mm film cartridge including a protruding film leader having a forward-most reduced width portion.

Beginning with FIG. 1, a conventional 35 mm film cartridge 10, such as manufactured by Eastman Kodak Company, comprises a light-tight housing 12 and an unexposed filmstrip 14. The filmstrip 14, for the most part, is supported in a roll on a rotatable spool 16 inside the light-tight housing 12 and has a film leader 18 that protrudes outwardly through a light-trapping slit 20 in the housing. A forward-most portion 22 of the protruding film leader 18 has a reduced width as compared to the remainder of the filmstrip 14.

Figure 2:
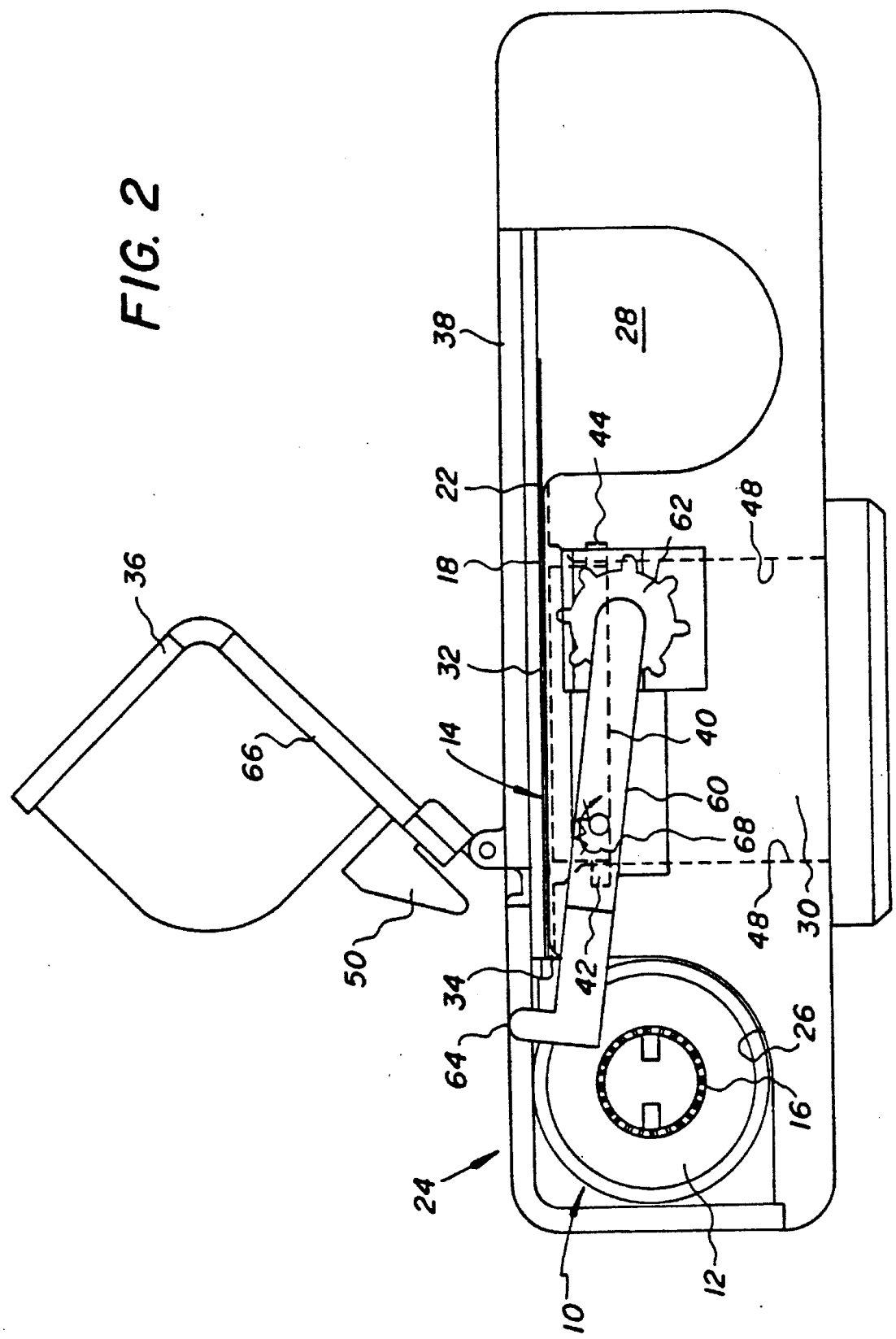
FIGS. 2 and 3 are bottom plan interior views of a camera for use with the film cartridge according to a preferred embodiment of the invention.

Referring now to FIGS. 2–5, a camera 24 comprises a cartridge receiving chamber 26 for receiving the film cartridge 10 with the protruding film leader 18, a separate film take-up chamber 28, a backframe opening 30 between the cartridge receiving chamber and the film take-up chamber at which successive sections of the filmstrip 14 (except for the protruding film leader) are to be exposed, and a film passageway 32 which extends over the backframe opening from the cartridge receiving chamber to the film take-up chamber. A light-trapping film passage slit 34 is formed between the cartridge receiving chamber 26 and the backframe opening 30 to permit the protruding film leader 18 beginning With its forward-most reduced width portion 22 to be longitudinally inserted through the film passage slit, along the film passageway 32, and to the film take-up chamber 28 when the film cartridge 10 is placed in the cartridge receiving chamber. A rear door 36 is supported to be closed to cover the cartridge receiving chamber 26. See FIGS. 3 and 5. A rear cover 38 independent of the rear door 36 is fixed over the film passageway 32 and the film take-up chamber 28 whether the rear door is closed and open. As shown in FIG. 2, the rear cover 38 is integrated with the rear door 36 when the rear door is closed.

A film support flap 40 is provided for supporting the forward-most reduced width portion 22 of the protruding film leader 18 over the backframe opening 30, in the film passageway 32, to prevent the forward-most reduced width portion from falling into and becoming jammed in the backframe opening when the forward-most reduced width portion is longitudinally inserted through the film passage slit, along the film passageway, to the film take-up chamber 28. The film support flap 40 is pivotally supported via a pair of spaced coaxial pivot pins 42 and 44 for swinging movement between a leader supporting position shown in FIGS. 2 and 4 and a retracted position shown in FIGS. 3 and 5. In the leader supporting position, the film support flap 40 is located within the backframe opening 30 and bridges the backframe opening as shown in FIG. 2. Thus, the film support flap 40 supports the forward-most reduced width portion 22 of the protruding film leader 18 over the backframe opening 30. In the retracted position, the film support flap 40 is received sufficiently within an opening or recess 46 in a wall 48 that defines the backframe opening 30 to be substantially aligned with the wall. Thus, the film support flap 40 is removed from the backframe opening 30 in order to permit successive sections of the filmstrip 14 to be exposed at the backframe opening.

Figure 3:
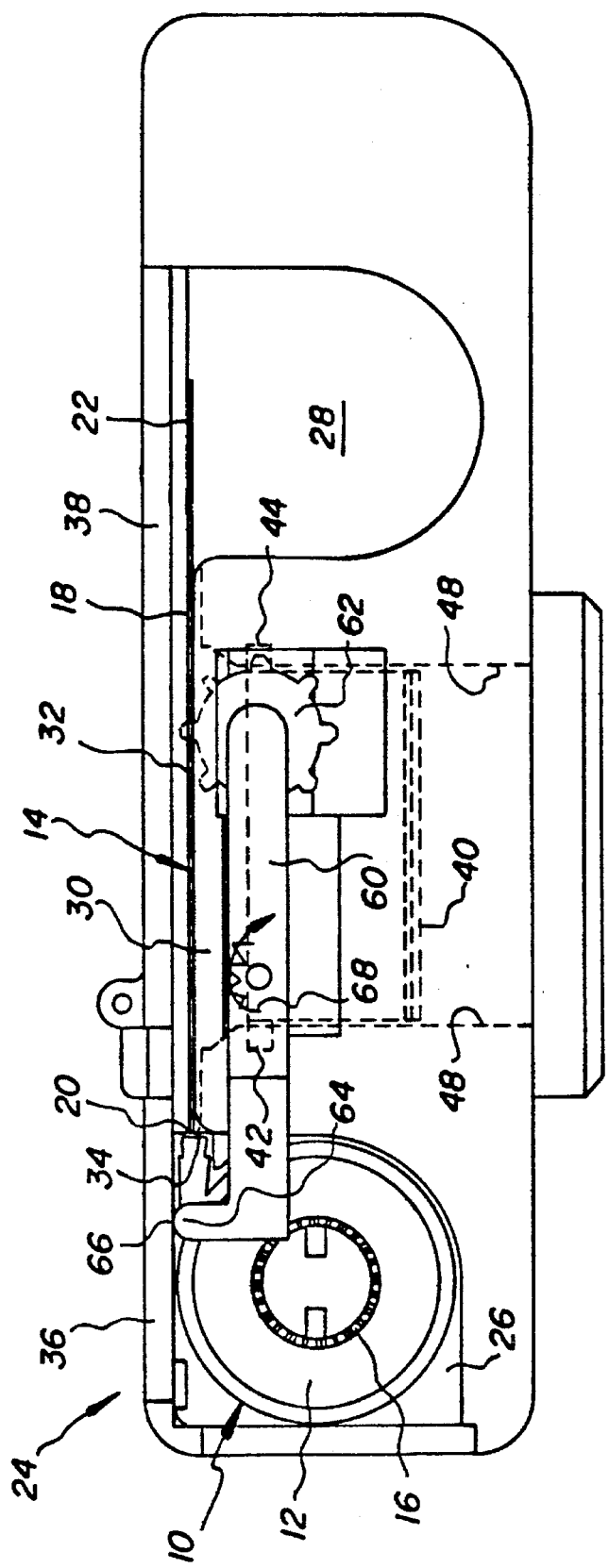
Figure 5:
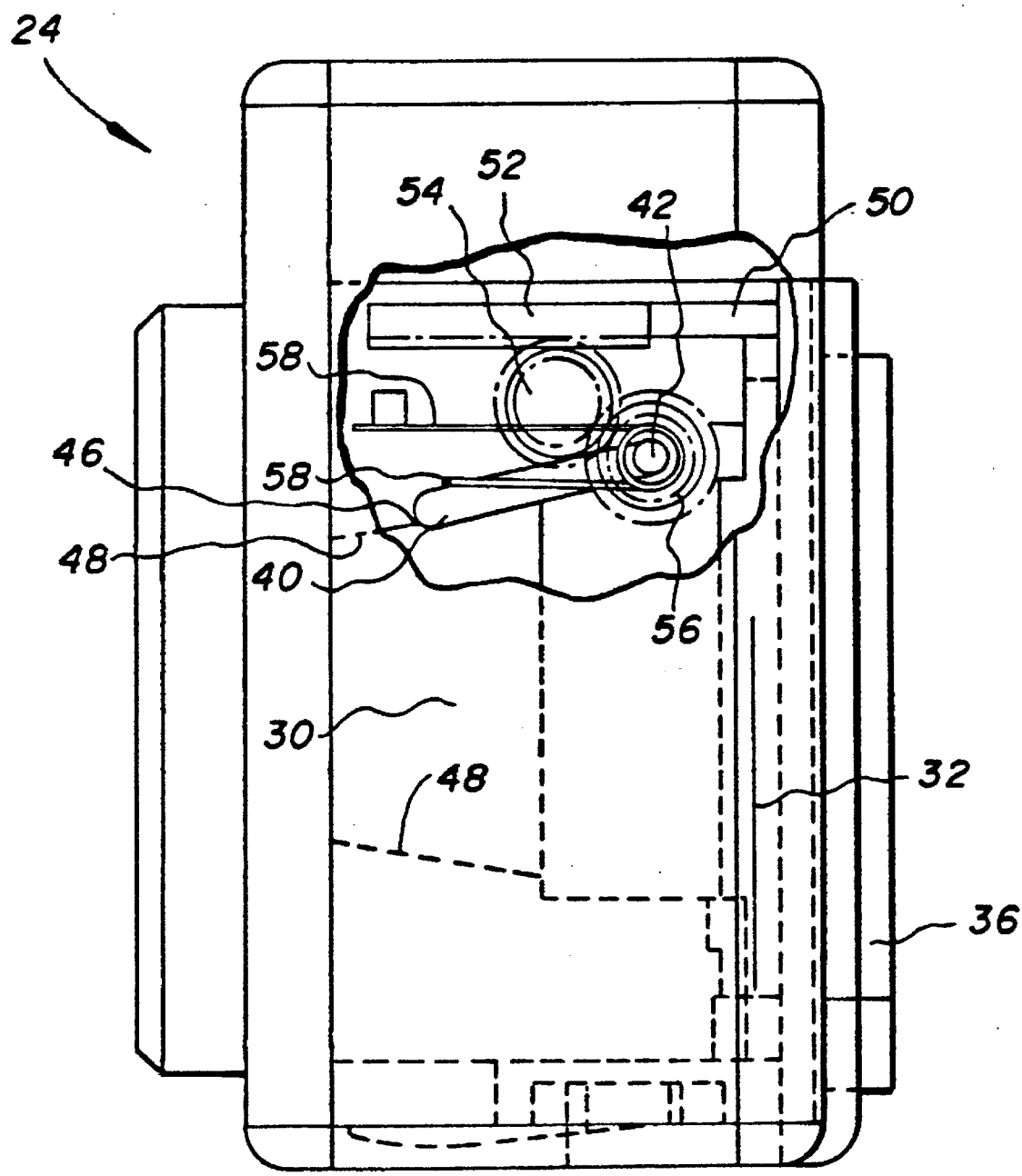

When the rear door 36 is closed as shown in FIGS. 3 and 5, an actuator 50 on the rear door translates a rack 52 to rotate a main pinion 54 to, in turn, counter-rotate a follower pinion 56. The follower pinion 56 is coaxially connected to the film support flap 40 to swing the film support flap contrary to the urging of a return spring 58 from its leader supporting position to its retracted position. Conversely, when the rear door 36 is opened, the actuator 50 is withdrawn from the rack 52 to permit the return spring 58 to swing the film support flap 40 from its retracted position to its leader supporting position and thereby reverse the follower pinion 56, the main pinion 54, and the rack 52.

Figure 4:
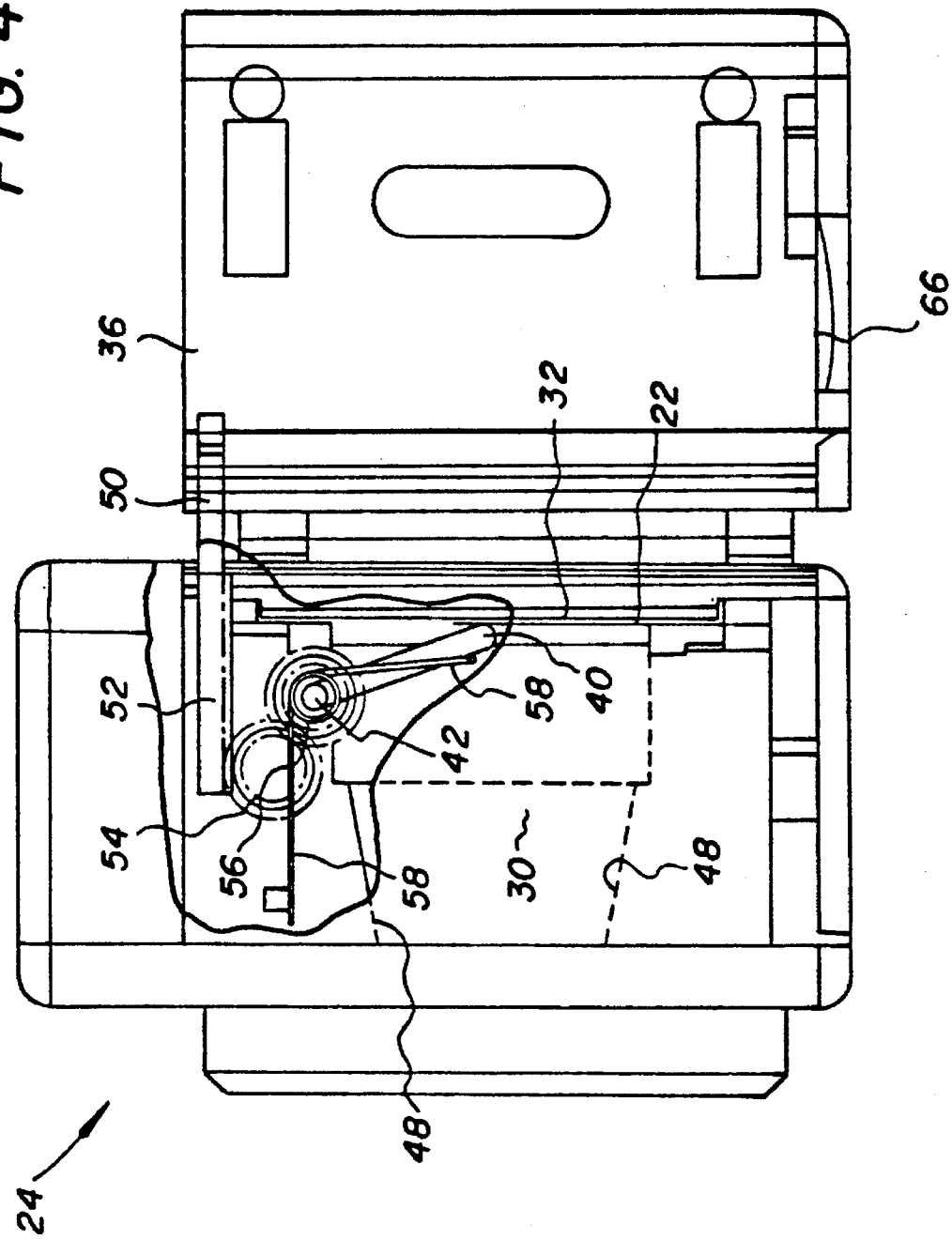
FIGS. 4 and 5 are side or end elevation interior views of the camera.

A pivotal link bar 60 supports a known sprocket 62 or the like for rotation in engagement with the filmstrip 14 and has a right-angled follower end 64 that protrudes into the cartridge receiving chamber (but out of the way of the film cartridge 10). When the rear door 36 is closed, a cam edge 66 on the rear door pushes against the follower end 64 to pivot the link bar 60 to move the sprocket 62 from outside the film passageway 32 as shown in FIG. 2 to inside the film passageway as shown in FIG. 4, to permit the sprocket to engage the filmstrip 14. Conversely, when the rear door 36 is opened, a return spring 68 biases the link bar 60 to reverse-pivot the link bar to move the sprocket from inside the film passageway 32 to outside the film passageway.

The invention has been described with reference to a preferred embodiment. However, it will be appreciated that variations and modifications can be effected by a person of ordinary skill in the art without departing from the scope of the invention.

PARTS LIST 10. film cartridge
12. light-tight housing
14. filmstrip
16. spool
18. film leader
20. light-trapping slit
22. forward-most reduced width portion
24. camera
26. cartridge receiving chamber
28. film take-up chamber
30. backframe opening
32. film passageway
34. film passage slit
36. rear door
38. rear cover
40. film support flap
42. pivot pin
44. pivot pin
46. opening or recess
48. wall
50. actuator
52. rack
54. main pinion
56. follower pinion
58. return spring
60. link bar
62. sprocket
64. follower end
66. cam edge
68. return spring

I claim:

1. A camera comprising a cartridge receiving chamber for receiving a film cartridge with a filmstrip having a film leader, a film passageway for the filmstrip, and a sprocket movable from outside to inside said film passageway to engage the filmstrip, is characterized in that:

a film slit is formed between said cartridge receiving chamber and said film passageway to permit the film leader to be longitudinally inserted through said film slit into the film passageway when said sprocket is outside the film passageway;

a rear cover is located over said film passageway;

a rear door independent of said rear cover is supported for closing to cover said cartridge receiving chamber and to move said sprocket from outside to inside said film passageway to engage the filmstrip, after the film leader is longitudinally inserted through said film slit into the film passageway.

2. A camera as recited in claim 1, wherein a pivotal link bar supports said sprocket for rotation in engagement with the filmstrip and protrudes into said cartridge receiving chamber to be pivoted to move said sprocket from outside to inside said film passageway when said rear door is closed.

3. A camera as recited in claim 2, wherein a spring biases said pivotal link bar to pivot to move said sprocket from inside to outside said film passageway when said rear door is opened.

4. A camera as recited in claim 1, wherein said rear door includes a cam and said sprocket is connected to a follower to move the sprocket from outside to inside said film passageway when the rear is closed.

\* \* \* \* \*